(12) United States Patent
Hoover

(10) Patent No.: US 7,100,899 B2
(45) Date of Patent: Sep. 5, 2006

(54) WEED PULLER

(76) Inventor: Jerry M Hoover, 4825 Edwards La., Fallon, NV (US) 89406

( * ) Notice: Subject to any disclaimer, the term of this patent is extended or adjusted under 35 U.S.C. 154(b) by 199 days.

(21) Appl. No.: 10/717,724

(22) Filed: Nov. 19, 2003

(65) Prior Publication Data

US 2004/0108495 A1 Jun. 10, 2004

Related U.S. Application Data

(60) Provisional application No. 60/428,051, filed on Nov. 20, 2002.

(51) Int. Cl.
*B66F 3/00* (2006.01)
(52) U.S. Cl. ..................................... 254/132
(58) Field of Classification Search .................. 294/50, 294/50.5, 50.6, 50.9; 172/375, 378, 371; 254/2.5, 132, 131
See application file for complete search history.

(56) References Cited

U.S. PATENT DOCUMENTS

| | | | | |
|---|---|---|---|---|
| 107,060 | A | * | 9/1870 | Judson ........................ 172/375 |
| 120,143 | A | * | 10/1871 | Wright ........................ 172/375 |
| 1,706,658 | A | * | 3/1929 | Davis .......................... 172/380 |
| 3,952,812 | A | * | 4/1976 | Lucan ......................... 172/375 |
| 6,213,527 | B1 | * | 4/2001 | Lampe ....................... 254/132 |

* cited by examiner

*Primary Examiner*—Robert C. Watson
(74) *Attorney, Agent, or Firm*—Townsend and Townsend and Crew

(57) ABSTRACT

A weed puller for gathering weeds at the interstices between the weed foliage above the ground and the weed root below the ground includes a handle for being held by a standing operator at one end and supporting a body at the bottom distal end. The body defines two blunted prongs on either side of a central axis on the body extending away from the attachment to the handle through the body. The two prongs define therebetween a V-shaped gathering gap with blunted opposed V-shaped edges on either side of the axis. There is a second body portion including portions of the two prongs, the first portion being divided from the second portion along a bending axis normal to the central axis of the body. The second body portion includes portions of the two prongs bent upwardly and away towards the handle at an obtuse angle along the bending axis to form a weed pulling cradle area in the body. When a weed is gathered between the V-shaped gathering gap between the weed foliage and the weed root, the weed is pulled at the weed root immediately underlying the weed foliage between the first body portion and the second body portion to center in the weed pulling cradle area when the handle is withdrawn from the ground towards the standing operator. Weed removal with the attached root and undisturbed seeds can result.

9 Claims, 3 Drawing Sheets

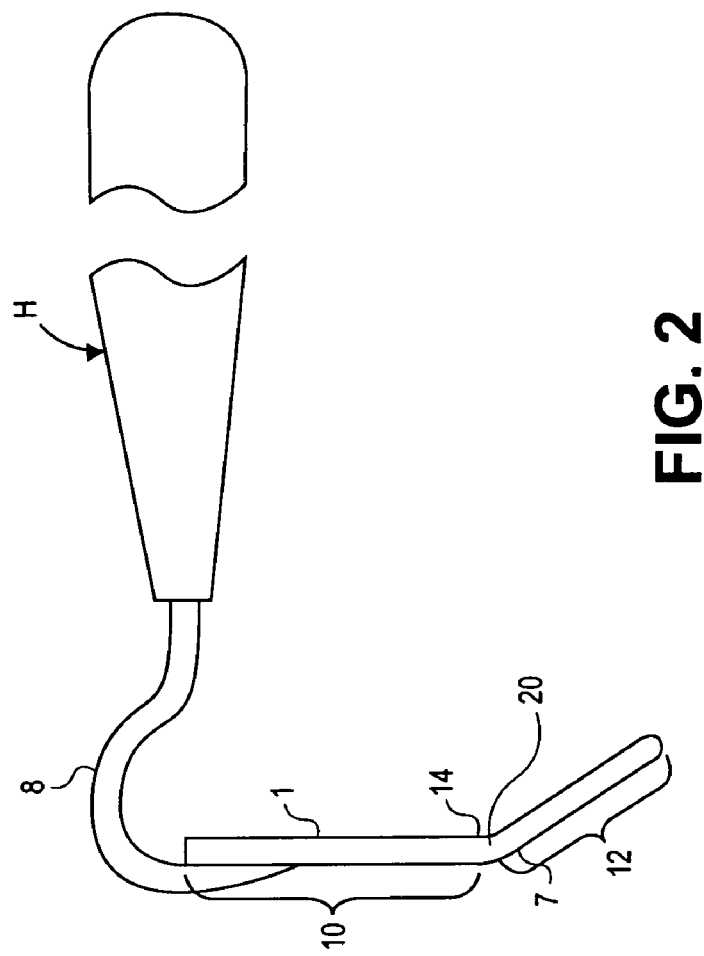
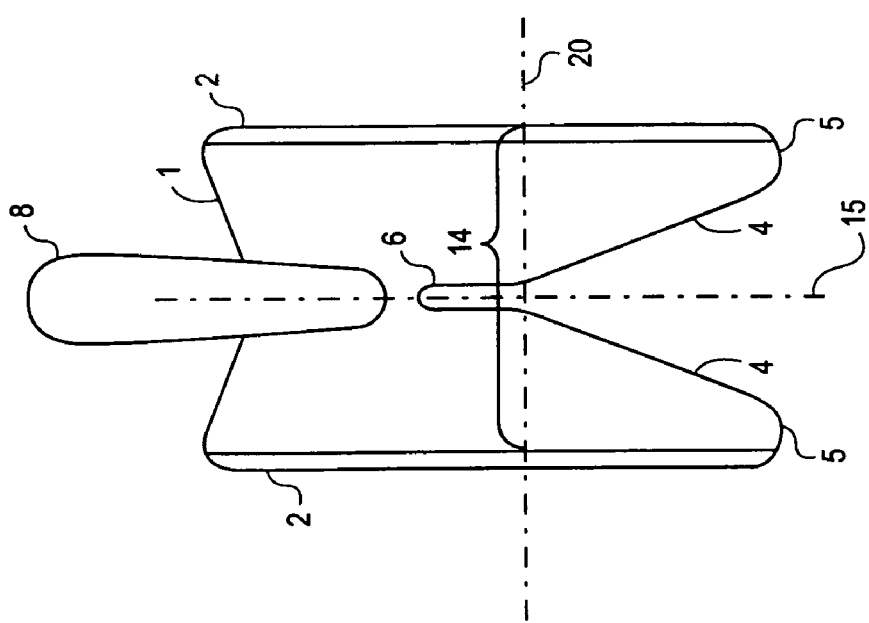

WEED PULLER

CROSS-REFERENCES TO RELATED APPLICATIONS

This patent application claims priority from U.S. Provisional Patent Application No. 60/428,051 filed Nov. 20, 2002 entitled "Hoe".

BACKGROUND OF THE INVENTION

This invention relates to an implement for weeding, commonly referred to as a hoe. The implement herein disclosed gathers weeds between the foliage and the root, abuts and gathers to the weed at the root immediately below the foliage with a non-cutting edge, and enables pulling and dislodgement of the weed with an essentially shock-free movement by pulling the tool handle toward the user with a simple continuous motion.

Weeds, for example puncture vines, sand burrs, and other ground-hugging weeds, have two methods of survival. First, when the weed is dislodged, as being eaten by an animal or pulled from the ground by a gardener, the plant undergoes a jarring shock-like motion. This jarring shock-like motion on the plant dislodges multitudes of mature seeds. Although the plant may be entirely gone (including the root), the seeds are not gone. As a result, and on a long-term basis, the seeds germinate, new weeds grow, and the weeds return.

Second, in the usual case when the weed is dislodged, the root remains behind. It is well known that weeds regenerate rapidly from roots remaining after the bulk of the plant is "weeded". Such regeneration is fast, as the weed already has an established root system ready to supply a full stream of nutrients to the new rapidly growing weed foliage.

DISCOVERY OF THE PROBLEM

I have discovered that standard hoes, instead of solving the problem of weeds, aggravate the problem of weeds. This is easy to understand in terms of the two methods of weed survival described above. While the removal of weeds is a centuries old problem, others have failed to design hoes with the above criteria in mind. This being the case, I claim the design of my hoe in view of the problems above as part of my invention. It will be understood that the discovery of the problem to be solved—the removal of weeds without dislodgement of seeds and taking the root with the plant—as well as a solution to the problem—a hoe specifically designed to prevent weed plant jarring (and seeds spreading) and to permit gradual weed pulling (taking the weed root) using the full natural fulcrum of the body—constitutes invention.

To understand the design of my invention, it is first necessary to review "normal" operation of a hoe.

First, almost all hoes have a long handle with a blunt, planar hoe body at right angles to the handle, protruding outwardly from the distal end of the handle and terminating in a flat, linear and typically blunted edge. The blunt edge is used as a scraping edge. The hoe at the blunt edge is moved along at ground level between the plant foliage on the upper surface of the hoe and the plant root protruding into the ground on the lower surface of the hoe. This movement is typically continued until the root is encountered. When the root is encountered, two things happen. First, the plant is jarred with a shock-like motion. This jarring shock-like motion dislodges seeds, usually in the hundreds, at the site of the plant dislodgement. Second, in the usual case, foliage of the plant is severed from the root. Typically, the ground is littered with the seeds. Further, the fully developed root system remains behind the decapitated weed. The weeds are ready for rapid seed regeneration and even faster root regeneration.

Hoes have an additional disadvantage. They are activated by a "hoeing motion", which induces "hoe fatigue". As is well-known to any gardener, constant hoeing motion induces fatigue. This fatigue can be easily understood, by analyzing the hoeing forces placed on the hoe.

Assuming that a person has a hoe with a full-length handle, two force vectors are applied through the handle to the blunt edge of the hoe body of the hoe. The first force is a downward force towards the ground. This force maintains the leading and blunt edge of the hoe in contact with the ground (typically at an angle) during the hoe's motion over the ground.

Stopping here, part of the fatigue of operating the hoe is readily identifiable. The user of the hoe, standing at the end of the handle, is required to exert a torque-like motion on the hoe handle through his arms onto the ground. Thus, the arms can become tired. At the same time, in order to exert this force vector through his arms, the user's spine and torso have to exert an equal and opposite force vector counter to the force vector of the arms. Thus the torso and spine can become tired. The end result, just from the downward force vector, is fatigue. Both the arms and the upper body of the hoe operator become tired in applying this first torque vector to the hoe.

The second force vector that the user has to exert is simultaneous with the first force vector. While the hoe has the downward force exerted upon it, it must be pulled across the ground. In other words, while the arms are torquing the hoe down and the spine is torquing in the opposite direction, the edge of the hoe has to be pulled over the ground, typically at its linear blunted edge. This motion is accomplished either through movement of the hoe operator's feet over the ground or alternatively by a pulling motion of the arms, this pulling motion being superimposed upon the torquing motion of the arms and spine previously described. Simply stated, normal operation of the hoe is fatiguing.

Furthermore, when the hoe operator becomes fatigued, the motions described are abandoned and a short-cut substituted therefor. The hoe operator literally begins to hack at the ground, in a manner not unlike the operation of an ax on wood. This hacking motion produces a violent shaking on the weed. Seeds are dislodged. At the same time, the root is cut. Simply stated, the fatigued operator of the hoe aggravates the tendency of the hoe operator to prolong the persistence of weeds.

PRIOR ART

Having designed my hoe, which will be described in detail below, I had the completed design used as a blueprint to search for the closest prior art. The references identified are: Davis U.S. Pat. No. 1,706,658 issued Mar. 26, 1929; Ing U.S. Pat. No. 2,266,677 issued Dec. 16, 1941; and Sapia U.S. Pat. No. 3,293,674 issued Dec. 27, 1966. These references will be discussed against the problems of weed regeneration and normal hoe operation.

Davis '658 relates to a small greenhouse hoe with a short handle where one cannot stand upright. It includes paired prongs which are arcuate. The arcuate prongs are specifically designed "to be placed beneath the soil". The two gathering prongs force the plant root towards a central receiving slot. This central receiving slot is opened and sharpened for the cutting of roots, rather than the gathering of roots. The outside edges of the hoe, at the outside edges of the gathering prongs, are blunt so as not to damage other nearby foliage. The device is not a body hoe; it is instead a hand hoe. Consequently, it does not address any of the "hoe fatigue" factors outlined above.

Ing '677 discloses a garden implement which is a digging and cultivating tool. It is a full-size garden implement, but it is obviously not intended to be operated in the manner of the hoe. It has a flat, planar head with two protruding flat and planar gathering prongs. The gathering prongs terminate in a V-shaped groove. The edges leading to the terminus of the V-shaped groove are sharpened. Root cutting is intended, and not avoided. Furthermore, each of the planar gathering prongs is sharpened. Ground penetration is clearly intended. The garden implement is obviously operated with a repeated "chopping" motion with respect to the ground and growing weeds. Viewed in terms of the weed factors reviewed above, both sharp jarring of the plant and cutting of the root will result. Although "hoe fatigue" is not considered or suggested, fatigue from a continuous chopping motion will obviously result.

Sapia '674 discloses and is entitled and indeed discloses a "Combination Sickle and Weed Pulling Tool". It is a full-size gardening implement which is designed for two flat prongs to penetrate the ground while gathering a weed at the roots to a blunted V-shaped groove. Both sides of the implement are sharpened to operate in the manner of a sickle, requiring a constant side-to-side motion when the implement is used as a sickle. When the instrument is used as a weeding tool, the two sharpened and pointed prongs first penetrate at an angle into the ground; presumably this penetration is caused by a flat and chopping motion with the handle. Thereafter, and once penetration of the two prongs has occurred to the ground, the handle is rotated away from the standing operator of the hoe. This causes the implement body to bear upon the ground, in a manner not unlike a fulcrum, and pivot the two prongs out of the ground, thereby dislodging a considerable amount of soil in vicinity of the root. In such motion, gathering of the root is not at the interface between the plant foliage and the immediately underlying ground. It is instead typically at a position (as illustrated in FIG. 2 of Sapia) below the ground. The removal of the plant is caused by a pivotal-type motion of the handle away from the user. In terms of the weed regeneration discussed above, a shock-like jarring motion on the weed results in the likelihood of seeds being dislodged. With respect to the problems of "hoe fatigue", a hoeing motion is never considered.

BRIEF SUMMARY OF THE INVENTION

A weed pulling hoe for gathering weeds at the interstices between the weed foliage above the ground and the weed root below the ground includes a hoe handle for being held by a standing hoe operator at one end and supporting a hoe body at the bottom distal end. The hoe body defines two blunted prongs on either side of central axis on the hoe body extending away from the attachment to the hoe handle through the hoe body. The two prongs define therebetween a V-shaped gathering gap with blunted opposed V-shaped edges on either side of the axis. The hoe body has a rectilinear exterior profile with a first hoe body portion which is planar and at substantial right angles to the handle between the attachment to the handle and the V-shaped gathering gap. There is a second hoe body portion including portions of the two prongs, the first portion being divided from the second portion along a bending axis normal to the central axis of the hoe body. The second hoe body portion includes portions of the two prongs bent upwardly and away towards the hoe handle at an obtuse angle along the bending axis to form a weed pulling cradle area in the hoe body. When a weed is gathered between the V-shaped gathering gap between the weed foliage and the weed root, the weed is pulled at the weed root immediately underlying the weed foliage between the first hoe body portion and the second hoe body portion to center in the weed pulling cradle area when the handle is withdrawn from the ground towards the standing hoe operator. Weed removal with the attached root and undisturbed seeds can result.

An advantage of this invention is that weed removal occurs with a smooth, non-jarring, non-shock-like motion. The entire weed plant, foliage and root, can be removed in a continuous, essentially smooth motion.

A further advantage of this invention is that a conventional hoeing motion is not utilized for the removal of weeds. By the expedient of sliding the blunted prongs over the ground to a weed, and letting the paired prongs center the weed root at the root/foliage interface, the energy that is required for aligning the center of the weed puller of the present invention with a weed that is to be removed is minimized. Effort required for weed removal is likewise minimized. The standing operator pulls the hoe handle towards his person using a backwards moving motion to which his body momentum and weight is easily applied. A gradual weed removing motion imparting minimal jarring and shock-like motion to the weed being removed results.

BRIEF DESCRIPTION OF THE DRAWINGS

FIG. 1 is a bottom plan view of the weed pulling hoe of my invention illustrating a "shepherd's crook" attachment to the bottom planar portion of the blade body immediately above the terminus of the gathering notch and illustrating the blunted gathering prongs protruding outward from the blade body;

FIG. 2 is a side elevation of the weed pulling hoe illustrating the shepherd's crook attachment to the bottom planar portion of the blade body and further illustrating the bend of the gathering prongs at the weed cradle area to enable the gathered weed at the interstices between the foliage and root to be centered and pulled from the ground by a corresponding pulling motion on the handle by the user;

DETAILED DESCRIPTION OF THE INVENTION

Figure 3A:
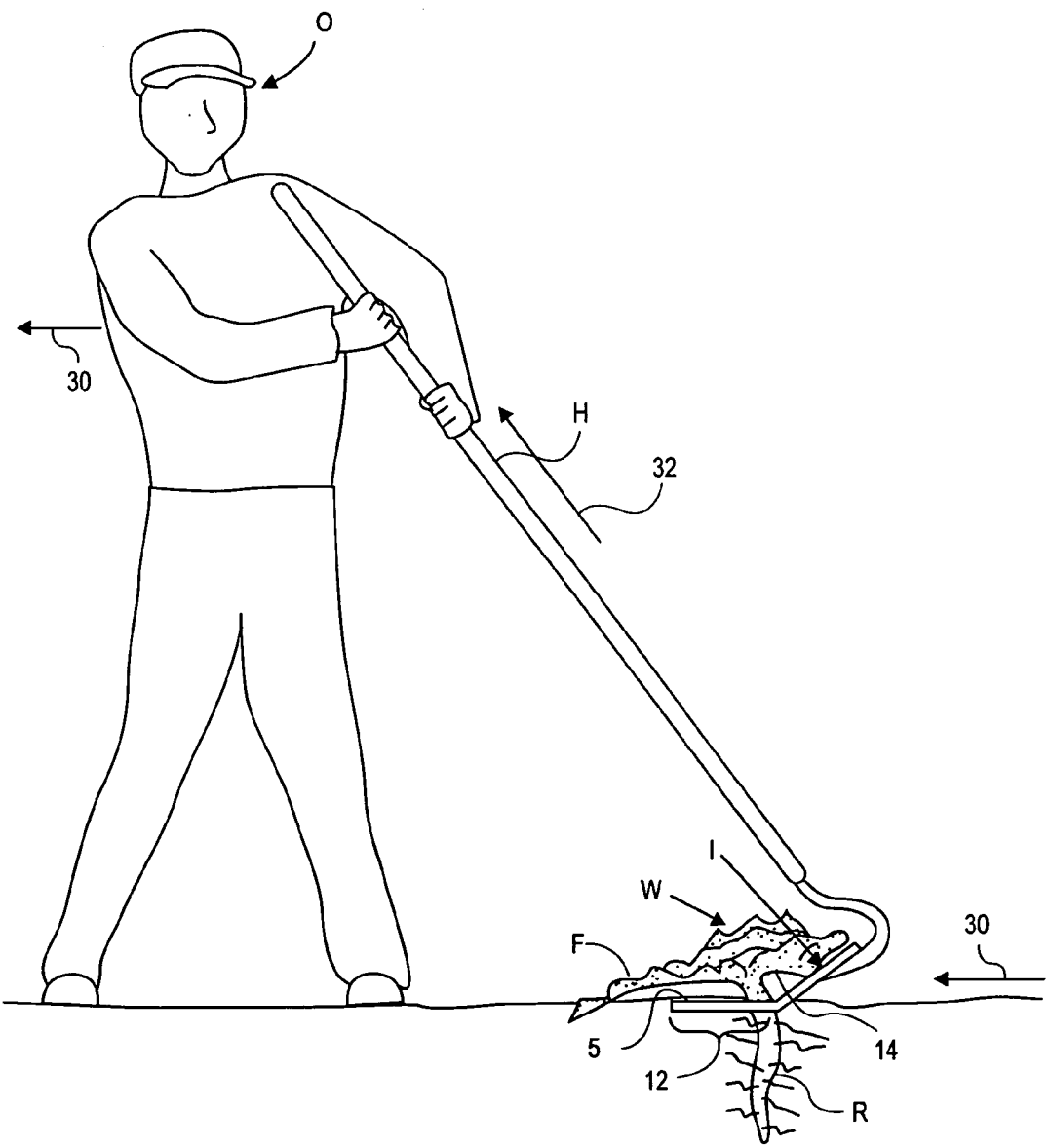
FIG. 3A is a perspective view of a user having inserted the blade body at the interstices between the weed foliage and root about to pull the weed with a continuous, gentle and full body leveraged movement from the ground for dislodging of the weed with seeds intact and root withdrawn.

Referring to FIGS. 1 and 2, (fore shortened) hoe handle H is shown fastened by shepherd's crook 8 to hoe body 1. As can be seen, hoe body 1 is essentially normal to the elongate handle H. I prefer the shepherd's crook 8 attachment here illustrated at the bottom of hoe body 1. As will hereinafter be set forth, the main ground contact of the hoe occurs along the bottom of the blunted prongs 5; thus the shepherd's crook's attachment at the bottom of the hoe body 1 in no way interferes with the intended operation of the hoe.

Concentrating on FIG. 1, two blunted prongs 5 extended on either side of hoe body axis 15. These two blunted prongs 5 defined therebetween a V-shaped gathering gap with blunted opposed V-shaped edges 4 on either side of the axis 15. While not required, I prefer that blunted V-shaped edges 4 terminate at a radiused notch 6. Indeed, close observation of radiused notch 6 will observe that the edges leading to radiused notch 6 are themselves very slightly tapered so as to wedge gathered roots within the notch.

It will be observed that hoe body 1 has an overall rectilinear profile. Further, and on opposite sides of the rectilinear profile parallel to axis 15, sharpened edges 2 are provided. Simply stated, during normal operation of the hoe, immature weeds can be encountered. By rotating the hoe 90°, either of the sharpened edges 2 can be addressed to such immature plants and the plants exterminated before full growth occurs.

Referring to FIG. 2, hoe body 1 is bent. Such bending occurs along an axis 20. There is a first hoe body flat portion 10 on one side of axis 20. There is a second hoe body flat portion 12 on the other side of axis 20. It is to be noted that both hoe body portions are flat; it is preferred that hoe body 12 be flat. This is the chief ground-contacting portion of hoe body 1.

Referring back to FIG. 1, it will be understood that weed cradle area 14 is defined on hoe body 1 along axis 20. As will hereinafter be understood with respect to FIG. 3, when a weed is centered on the ground in the interface between the root and overlying foliage within the V-shaped edges, the underside of the weed foliage will conform to and confront the overlying surface of hoe body 1 at weed cradle area 14. When a standing operator O leans backwardly with arms more or less extended, the weed trapped at the foliage immediately overlying the root can be extracted from the ground with a continuous gentle pulling motion to which the full momentum of the standing operator's body is easily applied.

Figure 3B:
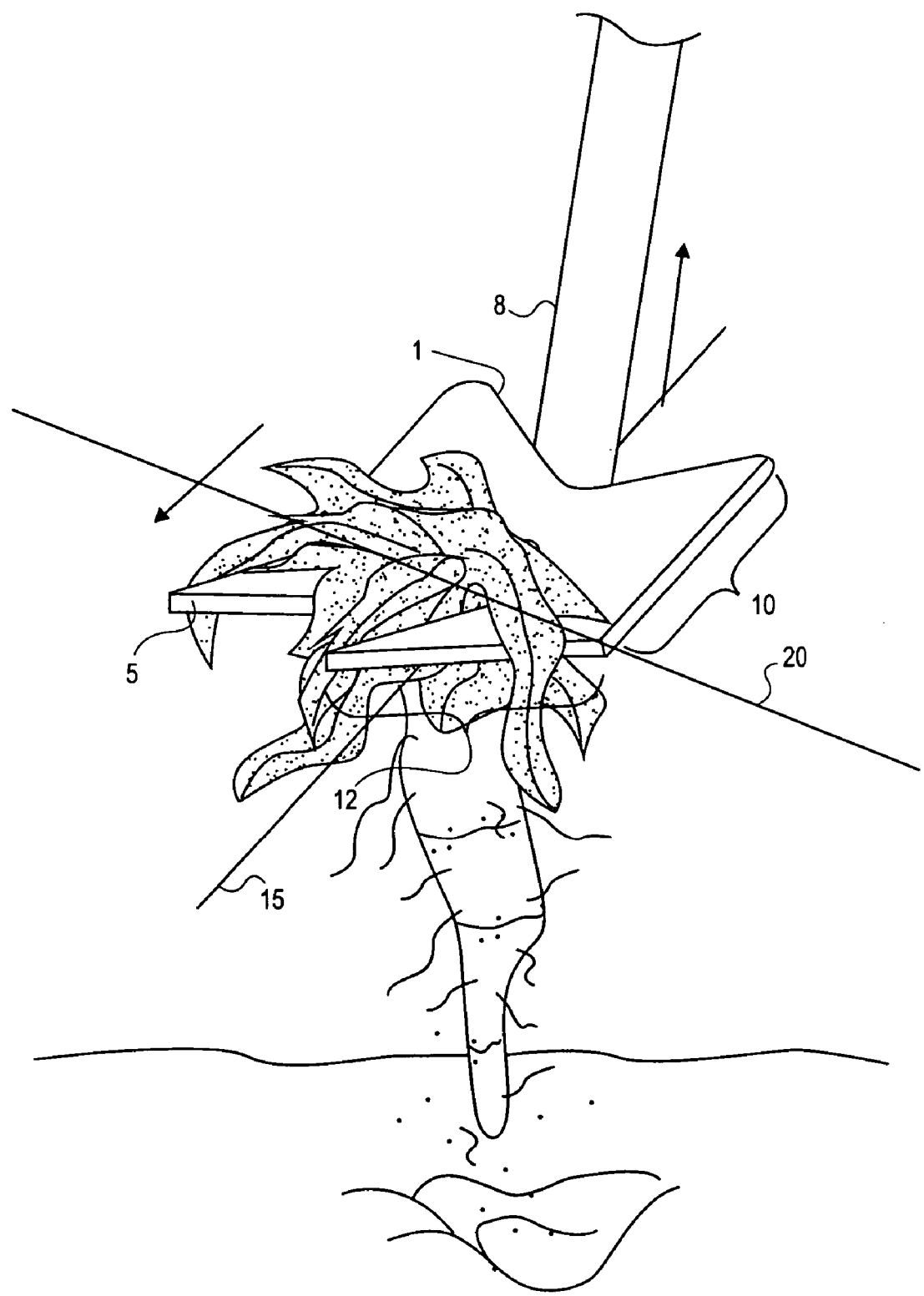
FIG. 3B is an expanded view of the weed at the hoe body being removed from the soil.

Referring to FIGS. 3A and 3B, a standing operator O's arms and hands are shown grasping handle H. Operator O has caused hoe body 1 to slide along the bottom of hoe body portion 12 in the direction of arrow 30 with blunted prongs 5 gathering weed W in the blunted V-shaped grooves 4. It will be seen that the weed is gathered between overlying foliage F and underlying root R. Such movement occurs with little or no effort on the part of operator O.

Observing FIGS. 3A and 3B further, it will be seen that operator O is leaning or moving backwardly as indicated by arrow 30. At the same time, operator O is lifting handle H in the direction of arrow 32. This movement causes weed W to center along weed cradle area 14; sliding of weed W off the blunted prongs 5 cannot occur. At the same time, a constant and continuous non-jarring and non-shock generating force of removal is applied upwardly in the direction of arrow 32 to the weed W. Weed removal occurs.

Not only is there a constant and continuous non-jarring and non-shock generating force of removal, but the traditional "hoeing motion" is completely absent from the disclosed weeding procedure. Likewise, there is no chopping or hacking at the ground. Instead, two simple motions of standing operator O have been substituted for the fatiguing hoeing motion. First, there is the light and guided motion of hoe body 1 at the underside of second hoe body portion 12 along and over the ground until weed W is centered at the root R immediately underlying the foliage F. Second, and once this centering has occurred, standing operator O leans backwardly to remove weed W with the full weight and leverage of his body applied to the slow, forceful but non-shock-like weed removal motion.

The tool includes its own method of operation, which I claim herein. However, the reader will note that the tool itself is virtually "self-instructing". Once a user is possessed of the tool, and removes a weed using the opposed V-shaped groove and cradle area of the hoe, the user quickly falls into the pulling and non-fatiguing motion that is required by the shape of the tool.

I show an angle of approximately 30° along the bend axis 20. This bend may vary 20° either way. The important function of the bend is to form the weed cradle area 14 so that upon the backward pulling motion of the standing operator, the weed does not slide off of blunted prongs 5. Further, substitution of attachment can be made for the preferred shepherd's crook 8 here utilized. Further, radiused notch 6 is not absolutely required but is preferred.

What is claimed is:

1. A weed puller for gathering weeds at the interstices between the weed foliage above the ground and the weed root below the ground, the weed puller comprising:

a handle for being held by a standing operator at one end and supporting a body generally normal to the handle at a bottom distal end thereof;

the body defining two blunted prongs on either side of a central axis of the body extending away from the handle along the body, each prong terminating in a free end;

the two blunted prongs defining therebetween a V-shaped gathering gap formed by blunted opposed V-shaped edges on either side of the axis which extend from the free ends of the prongs to a blunted, rounded inner end of the gap;

the body having a first body portion which is planar and at substantial right angles to the handle between the handle and the V-shaped gathering gap, the inner end of the gap being located in the first body portion, and a second body portion which is planar and includes portions of the two blunted prongs including the free ends thereof, the first portion being separated from the second portion along a bending axis normal to the central axis of the body; and the second body portion including portions of the two prongs being bent towards the handle at an obtuse angle along the bending axis to form a weed pulling cradle area between the first body portion and the second body portion in the body;

whereby a weed gathered between the V-shaped gathering gap between the weed foliage and the weed root is pulled between the first body portion and the second body portion by the weed pulling cradle area when the handle is withdrawn from the ground towards the standing operator.

2. The weed puller according to claim 1 wherein the body defines a rectilinear exterior profile.

3. The weed puller according to claim 2 wherein the two prongs each define portions of the rectilinear exterior profile of the hoe body portion; and the body is sharpened along the rectilinear exterior profile for use of the body for conventional weeding.

4. A weed puller for pulling weeds including their roots out of the ground without severing the weeds from their roots, the puller comprising:

an elongated body defining a body axis and first and second body portions which are angularly inclined about a bending axis that is transverse to the body axis located between ends of the body, the first body portion being connected to a handle extending generally perpendicularly to the first body portion, the second body portion being inclined relative to the first body portion about the bending axis at an angle between 10° to 50°; and a generally V-shaped gap formed in the body and extending from an open end of the gap at a free end of the second body portion past the bending axis into the first body portion and terminating at a rounded, blunted end of the gap in the first body portion, a first section of the V-shaped gap being defined by blunted edges which diverge at a first, relatively larger angle towards the open end of the gap, a second section of the gap defined by blunted edges extending from the rounded, blunted end of the gap to the first section of the V-shaped gap which diverges at a second, relatively lesser angle towards the first section of the V-shaped gap to form a relatively narrow slot proximate the rounded, blunted end of the gap accommodating the root of the weed when the puller is pulled along the ground and the root has entered the gap without severing the root while a plant portion of the weed is gathered on top of the body in the vicinity of the bending axis to thereby permit pulling the weed including its root out of the ground.

5. A weed puller according to claim 4 wherein the angle is approximately 30°.

6. A weed puller for removing weeds including their roots from the ground comprising:

a generally rectilinear plate having a length which is greater than its width and defining first and second plate portions which are contiguous in a longitudinal direction of the plate;

a connector proximate a longitudinal end of the first plate portion for attaching a handle to the plate; and a V-shaped slot having opposing, blunted sides and a rounded, blunted inner slot end connecting the sides extending in a longitudinal direction from a free end of the second plate portion towards and into the first plate portion, the slot having a first section extending from the free end of the second plate portion towards the inner slot end and a second section between the inner slot end and the first section, sides of the slot along the first section thereof converging towards the inner slot end and sides of the slot along the second section being substantially parallel, the second plate portion being bent relative to the first plate portion in a transverse direction at a location along the length of the plate to form a weed gathering cradle defined by the first and second plate portions which overlies the slot.

7. A weed puller according to claim 6 wherein lateral sides of the plate define sharpened edges.

8. A weed puller according to claim 4 wherein the first and second body portions in a vicinity of the bending axis define a weed gathering cradle, and wherein the gap overlies the weed gathering cradle to facilitate pulling the weeds including their roots from the ground when the weed gathering cradle supports the weeds while their roots extend through the gap.

9. A weed puller according to claim 6 wherein the second plate portion is angularly inclined relative to the first plate portion by an angle of 30°.

* * * * *